US012186806B1

(12) United States Patent
Yin et al.

(10) Patent No.: US 12,186,806 B1
(45) Date of Patent: Jan. 7, 2025

(54) METHOD FOR IN-SITU MONITORING OF FULL CYCLE OF SPATTER FORMATION, EJECTION, AND FALLING IN LASER ADDITIVE MANUFACTURING

(71) Applicant: CHINA UNIVERSITY OF GEOSCIENCES (WUHAN), Wuhan (CN)

(72) Inventors: Jie Yin, Wuhan (CN); Zuowei Yin, Wuhan (CN); Kai Guan, Wuhan (CN); Jinze Cheng, Wuhan (CN); Xingyu Chen, Wuhan (CN); Zheng Li, Wuhan (CN); Qiao Chen, Wuhan (CN); Tianye Huang, Wuhan (CN); Andong Zhu, Wuhan (CN); Shiyi Zhou, Wuhan (CN)

(73) Assignee: CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 0 days.

(21) Appl. No.: 18/605,847

(22) Filed: Mar. 15, 2024

(30) Foreign Application Priority Data

Sep. 11, 2023 (CN) .......................... 202311159483.5

(51) Int. Cl.
*B22F 10/80* (2021.01)
*B22F 10/28* (2021.01)
*B33Y 50/00* (2015.01)

(52) U.S. Cl.
CPC .............. *B22F 10/80* (2021.01); *B22F 10/28* (2021.01); *B33Y 50/00* (2014.12); *B22F 2304/10* (2013.01)

(58) Field of Classification Search
CPC ...... B22F 10/80; B22F 10/28; B22F 2304/10; B33Y 50/00
See application file for complete search history.

(56) References Cited

U.S. PATENT DOCUMENTS 10,449,696 B2   10/2019   Elgar et al.
11,179,807 B2   11/2021   Martinsen
(Continued)

OTHER PUBLICATIONS

Li et al., "A Review of Spatter in Laser Powder Bed Fusion Additive Manufacturing: In Situ Detection, Generation, Effects, and Countermeasures," Micromachines 2022, 13, 1366. https://doi.org/10.3390/mi13081366 (Year: 2022).*

(Continued)

*Primary Examiner* — Ross Varndell
(74) *Attorney, Agent, or Firm* — True Shepherd LLC; Andrew C. Cheng

(57) ABSTRACT

The present disclosure provides a method for in-situ monitoring of a full cycle of spatter formation, ejection, and falling in laser additive manufacturing. In a spatter formation stage, a paraxial multiocular high-speed photographing apparatus is used to provide a high temporal-spatial resolution, accurately collect spatial positions of spatters at each sampling time, and reconstruct a motion trajectory of the spatters in three-dimensional (3D) space. In an ejection stage, a coaxial monocular high-speed photographing apparatus is used to provide a long-term high temporal-spatial resolution and accurately collect and count an ejection velocity and angle and a motion trajectory of the spatters, and a photodiode monitors a radiation intensity and changes of the spatters. In a falling stage, a multiocular photographing apparatus is used to provide a high spatial resolution covering an entire powder bed and collect a distribution state of falling spatters.

8 Claims, 15 Drawing Sheets

(56) References Cited

U.S. PATENT DOCUMENTS 11,752,547 B2 9/2023 Mathisen et al.
2021/0387261 A1* 12/2021 Takeshita ................ B22F 10/37

OTHER PUBLICATIONS

Vision Research's Data Sheet for Phantom® VXX12 Cameras, Dec. 2015. (Year: 2015).*

* cited by examiner

METHOD FOR IN-SITU MONITORING OF FULL CYCLE OF SPATTER FORMATION, EJECTION, AND FALLING IN LASER ADDITIVE MANUFACTURING

CROSS-REFERENCE TO RELATED APPLICATIONS

This application claims priority to Chinese Patent Application No. 202311159483.5 with a filing date of Sep. 11, 2023. The content of the aforementioned application, including any intervening amendments thereto, is incorporated herein by reference.

TECHNICAL FIELD

The present disclosure relates to the technical field of additive manufacturing, and in particular, to a method for in-situ monitoring of a full cycle of spatter formation, ejection, and falling in laser additive manufacturing.

BACKGROUND

Laser powder bed fusion (L-PBF), as one of the most potential and popular metal additive manufacturing technologies, can achieve rapid and precise formation of complex components. Therefore, the L-PBF has a very broad application prospect in aerospace (such as high-performance complex components), biomedical (such as porous and complex structures), and fashion creativity (such as personalized customization), but a defect formation mechanism thereof has not yet been fully explored.

Spatters, as a common by-product in L-PBF, have a significant impact on forming quality, and are directly related to stability and repeatability of forming. Compared with an L-PBF molten pool and welding spatters, L-PBF spatters feature in-situ monitoring difficulty, a complex forming mechanism, and great harm. Currently, a variety of spatter monitoring technologies have been widely studied, and a generating mechanism of "liquid-based" droplet spatters ejected from the molten pool and "solid-based" powder spatters ejected from a substrate is explored. A specific process is as follows. Firstly, the spatters generated by laser heating of powder include the liquid-based droplet spatters ejected from the molten pool and the solid-based powder spatters ejected from the substrate. Then metal vapor indirectly acts on powder particles, that is, the powder spatters are formed by inert entrainment gas flow induced by an entrainment effect. Metal vapor directly acts on the powder particles, that is, the metal vapor enters vapor plume or falls to a powder bed by means of a lifting force or a recoil force. However, research on full-cycle monitoring of spatters is still very limited.

Compared with in-situ monitoring of the molten pool, in-situ monitoring of spatters has higher difficulty. Generally, the molten pool moves with laser spots, and a motion range of the molten pool may be considered as being in a two-dimensional (2D) plane, but the spatter motion is in a three-dimensional (3D) space. Therefore, the in-situ monitoring of spatters should be extended from the 2D plane to the 3D space. This requires more in-situ sensors and processing of more information. Difficulties faced are specifically as follows. (1) Compared with the monitoring of the molten pool, it is more difficult to monitor spatters with a tiny size and a wide motion range in 3D space, which requires a large quantity of sensors (it is reported that there are four sensors currently) with a micron spatial resolution. (2) The molten pool is generated by the action of laser light in the metal powder bed, and its trajectory can be predicted according to a predefined laser path. In contrast, it is difficult to predict the trajectory of spatters because of high-speed random motion in 3D space. This requires sensors with a microsecond temporal resolution to monitor the entire process of motion trajectory deflection. (3) Spatter data collected by sensors with a high spatial resolution and a high temporal resolution are several orders of magnitude greater than monitoring data of the molten pool. Therefore, observation and data processing of spatters is more challenging than the monitoring of the molten pool.

Chinese patent CN. 114905738A discloses a method for in-situ measurement of a dynamic behavior of spatters in laser additive manufacturing. The method mainly provides a microsecond high temporal resolution by a binocular sensor and a laser pulse illumination source, accurately collects a spatial position of spatter particles at each sampling time, accurately describes the entire process of motion trajectory deflection after spatters are forced, and effectively overcomes the problem that it is difficult to observe spatter deflection in an existing in-situ measurement method. The patent only solves the problem of dynamic behavior monitoring of deflected spatter particles in a layer.

In an existing article, In-situ detection of redeposited spatter and its influence on the formation of internal flaws in laser powder bed fusion, the influence of spatter falling on internal flaws in laser additive manufacturing is explored by using a monocular camera in-situ monitoring method. However, this document only solves the problem of correlation between a distribution of single-layer falling spatters and the forming quality of laser additive manufacturing, ignoring a cumulative effect of spatter falling in multi-layer manufacturing.

Combined with the characteristics of spatters in L-PBF forming, such as diverse types (room-temperature cold spatters/high-temperature hot spatters), large quantity ($10^3$-105 per second), and unpredictability (3D randomness), the in-situ monitoring means are more complicated.

Therefore, how to achieve the in-situ monitoring of the full cycle of "formation, ejection and falling" of L-PBF spatters, and then grasp a spatter formation mechanism, a correlation between spatter and defects, and the influence of spatter on forming quality is an urgent problem to be solved by scientific researchers.

SUMMARY OF PRESENT INVENTION

An objective of the present disclosure is to provide a method for in-situ monitoring of a full cycle of spatter formation, ejection, and falling in laser additive manufacturing in view of the above-mentioned shortcomings in the prior art. By comprehensive application of strategies of "to reveal the spatter motion state by intra-layer, paraxial, point-by-point monitoring with high temporal resolution", "to obtain the spatter motion trajectory by intra-layer, coaxial, long-term monitoring with high temporal-spatial resolution" and "to reflect the spatter falling distribution by interlayer, paraxial, full-field monitoring with high spatial resolution", the in-situ monitoring of the full cycle of "spatter formation, ejection, and falling" of L-PBF spatters is achieved.

To achieve the above objective, the present disclosure adopts the following technical solutions:

The present disclosure provides a method for in-situ monitoring of a full cycle of spatter formation, ejection, and falling in laser additive manufacturing. The in-situ monitoring is completed by a monitoring system. The monitoring system includes a high-speed photographing apparatus, a multiocular photographing apparatus, and a photoelectric sensor. The method includes the following specific steps:

Step S1, spreading a powdered material onto a substrate of a laser additive manufacturing apparatus, and covering a laser travel path range to manufacture a powder bed, where the powdered material has a particle size of 10-500 μm;

Step S2, in a spatter formation stage, paraxially arranging, a paraxial multiocular high-speed photographing apparatus at the laser additive manufacturing apparatus to monitor a spatter dynamic behavior and morphological characteristics in the spatter formation stage;

in a spatter ejection stage, coaxially arranging a coaxial monocular high-speed photographing apparatus and the photoelectric sensor at the laser additive manufacturing apparatus to monitor a spatter kinematic behavior and radiation characteristics; and in a spatter falling stage, paraxially arranging the multiocular photographing apparatus at the laser additive manufacturing apparatus to allow an image field of view (FOV) to cover a laser-irradiated area and a vicinity thereof to monitor distribution characteristics, and analyze composition and content information of falling spatters online;

Step S3, starting a laser of the laser additive manufacturing apparatus, and scanning the powder bed manufactured in step S1 by the laser according to a planned path;

Step S4, observing a dynamic behavior and morphological characteristics of spatters above a molten pool by means of the paraxial multiocular high-speed photographing apparatus during layered manufacturing, where the dynamic behavior includes a velocity, an angle, a force state and a function of time during spatter formation; and/or observing a kinematic behavior and statistical characteristics of the spatters during the spatter formation stage by means of the coaxial monocular high-speed photographing apparatus, and monitoring radiation characteristics of spatter particles during motion in real time by means of the photoelectric sensor, where the kinematic behavior includes a velocity and an angle during spatter formation, so as to obtain a motion trajectory of the spatter ejection, and the statistical characteristics include a number of the spatters; the radiation characteristics include thermal radiation characteristics of the spatters; and observing, during layer-by-layer superposition, a falling distribution of the spatters by means of the multiocular photographing apparatus, and analyzing the composition and content information of the falling spatters online; and Step S5, collecting data of the dynamic behavior, the morphological characteristics, the kinematic behavior, the statistical characteristics, the radiation characteristics, the falling distribution, and the composition and content information obtained in step S4, so as to achieve the in-situ monitoring of the full cycle of spatter "formation, ejection, and falling".

Further, the paraxial multiocular high-speed photographing apparatus is provided with a paraxial laser illumination source, and the paraxial multiocular high-speed photographing apparatus has a temporal resolution of 0.1-10 μs and a spatial resolution of 1-10 μm/pixel, with a sampling time of $10^2$-$10^3$ μs at each layer.

Further, the coaxial monocular high-speed photographing apparatus is provided with a coaxial laser illumination source, and the coaxial monocular high-speed photographing apparatus has a temporal resolution of 10-100 μs and a spatial resolution of 10-100 μm/pixel, with a sampling time of $10^1$-$10^3$ s at each layer.

Further, the photoelectric sensor includes a photodiode.

Further, the multiocular photographing apparatus is provided with a paraxial illumination source, the multiocular photographing apparatus has a spatial resolution of 1-10 μm/pixel, the multiocular photographing apparatus acquires an exposure image of no more than 0.1 second during interlayer treatment, and a single image is output layer by layer.

Further, the paraxial laser illumination source and the coaxial laser illumination source each have peak power of 100-500 W, a wavelength of 640±10 nm or 810±10 nm, and pulse duration of 20-2,000 ns, and the paraxial illumination source has power of 50 W and a wavelength of 350-1100 nm.

Further, the paraxial multiocular high-speed photographing apparatus has an image FOV range of $10^0$-$10^1$ mm$^2$, the coaxial monocular high-speed photographing apparatus has an image FOV range of $10^1$-$10^2$ mm$^2$, and the multiocular photographing apparatus has an image FOV range of full field with $10^2$ mm$^2$.

Further, the material includes any one of a metal, a ceramic, and a polymer.

The term "paraxial" in the present disclosure means that an apparatus is mounted at a position different from a processing laser path of the laser additive manufacturing apparatus.

The term "coaxial" in the present disclosure means that an apparatus is mounted on the same processing laser path of the laser additive manufacturing apparatus.

The term "full field" in the present disclosure refers to an entire powder bed surface of the laser additive manufacturing apparatus.

The term "additive manufacturing" in the present disclosure refers to a 3D printing process of layered manufacturing and layer-by-layer superposition forming. The term "intralayer" in the present disclosure corresponds to layered manufacturing in additive manufacturing, that is, from the beginning of laser light emission from a processing laser to the end of printing at any layer during 3D printing of the layer in additive manufacturing, and it takes about $10^1$-$10^3$ s to print at each layer. The laser turning off falls in an "intra-layer stage". In the present disclosure, the term "interlayer" corresponds to layer-by-layer superposition in additive manufacturing, and the time from the end of printing at an $n^{th}$ layer (the processing laser is turned off, and a forming cavity descends by a certain height) before powder spreading at an $(n+1)^{th}$ layer falls in an "interlayer stage", and a total time for layer-by-layer printing is about $10^2$-$10^3$ h.

The full cycle of spatter formation, ejection, and falling refers to the spatter formation stage, a spatter ejection stage, and a stage of spatter falling to the powder bed during layered manufacturing.

In the spatter formation stage, the sample size of the spatter is relatively small, and a dynamic behavior and morphological characteristics of spatters are photographed by a high-speed camera, and a velocity, an angle and morphological changes during spatter formation are obtained through calculation and observation. Morphological characteristics include spatter shapes and brightness.

In the spatter ejection stage, the sample size of spatter is relatively large, a kinematic behavior and statistical characteristics of spatters are photographed by a high-speed camera, and a motion trajectory during spatter ejection is statistically obtained. With regard to radiation characteristics of the spatters, the photodiode collects radiation intensities during spatter ejection, which are stored separately at all layers, and the radiation characteristics are monitored by analyzing whether the radiation intensities are abnormal. Statistical characteristics include a number of ejected spatters. Statistics can be used for data processing when there is a large sample size of ejected spatters.

In the spatter falling stage, the sample size of the spatter is relatively large, and the falling distributions of spatters are photographed layer by layer by a multiocular photographing apparatus, and are stored separately at all layers. Compared with the spatter formation stage and the ejection stage, the falling distributions of the spatters are static, and morphological characteristics of falling spatters include a shape and a number, so that statistics can be used for data processing.

Compared with the prior art, the present disclosure has the following beneficial effects:

(1) The present disclosure provides a method for in-situ monitoring of a full cycle of spatter formation, ejection, and falling in laser additive manufacturing. Spatter particles in powder bed fusion are used as in-situ tracing particles to obtain a dynamic behavior, a kinematic behavior and morphological characteristics during spatter formation. A spatter behavior in an ejection stage and a spatter distribution in a falling stage are processed by means of a statistical method, to obtain a motion trajectory and a falling distribution of the spatter particles. Radiation characteristics and dynamic evolution of the spatter particles are measured by an optical sensing apparatus, so as to obtain a radiation change behavior of the spatter particles. A multiocular photographing apparatus according to the present disclosure includes an integrated multiocular camera, an illumination source, and a laser-induced breakdown spectroscopy (LIBS) composition analysis system. The optical sensing apparatus includes a photodiode. In a spatter formation stage, a high-speed camera and a laser illumination source provide a microsecond high temporal resolution and a high spatial resolution at micron per pixel level, accurately collect spatial positions of spatter particles at each sampling time and reconstruct a motion trajectory of the spatter particles in 3D space. In an ejection stage, a high-speed camera and a laser illumination source provide monitoring with a long-term microsecond high temporal resolution and a high spatial resolution at micron per pixel level, accurately collect and count a motion trajectory of spatter particles, and a photoelectric sensor continuously provides low-dimensional data, which can monitor a radiation intensity and changes of ejected spatters. In a falling stage, a multiocular camera provides a high spatial resolution at micron per pixel level to cover the entire powder bed, and can collect a distribution state of falling spatter particles. The innovative in-situ monitoring method combining three stages, that is, spatter formation, ejection and falling, is put forward, which achieves quality control of components and traceability of process data.

(2) For the overarching framework of in-situ monitoring, there is currently a lack of means for in-situ monitoring of spatters of an L-PBF additive manufacturing device compared with means for in-situ monitoring of a molten pool, and methods for spatter intra-layer monitoring and interlayer in-situ monitoring are sporadic and have not been organically integrated. In view of the status quo, in the present disclosure, the innovative novel method for in-situ monitoring of intra-layer/interlayer multi-stage and full-cycle process of "spatter formation, spatter ejection, and spatter falling" is provided closely based on process characteristics of laser additive manufacturing, as well as spatter ejection characteristics.

(3) For the multi-stage in-situ monitoring techniques in laser additive manufacturing, according to the present disclosure, an in-situ monitoring method that combines intra-layer multi-sensors and interlayer multiocular machine vision is provided. Multidimensional heterogeneous data combining "high-dimensional feature data from short-cycle sample-level sampling" and "low-dimensional feature data from long-cycle component-level sampling" is used to achieve intra-layer/interlayer in-situ monitoring of a spatter behavior in L-PBF additive manufacturing. The method can be used to explore evolution and formation of cracks, holes, deformation, and the like in laser additive manufacturing, and establish an internal relationship of "composition, process, and performance".

DETAILED DESCRIPTION OF THE EMBODIMENTS

Figure 1:
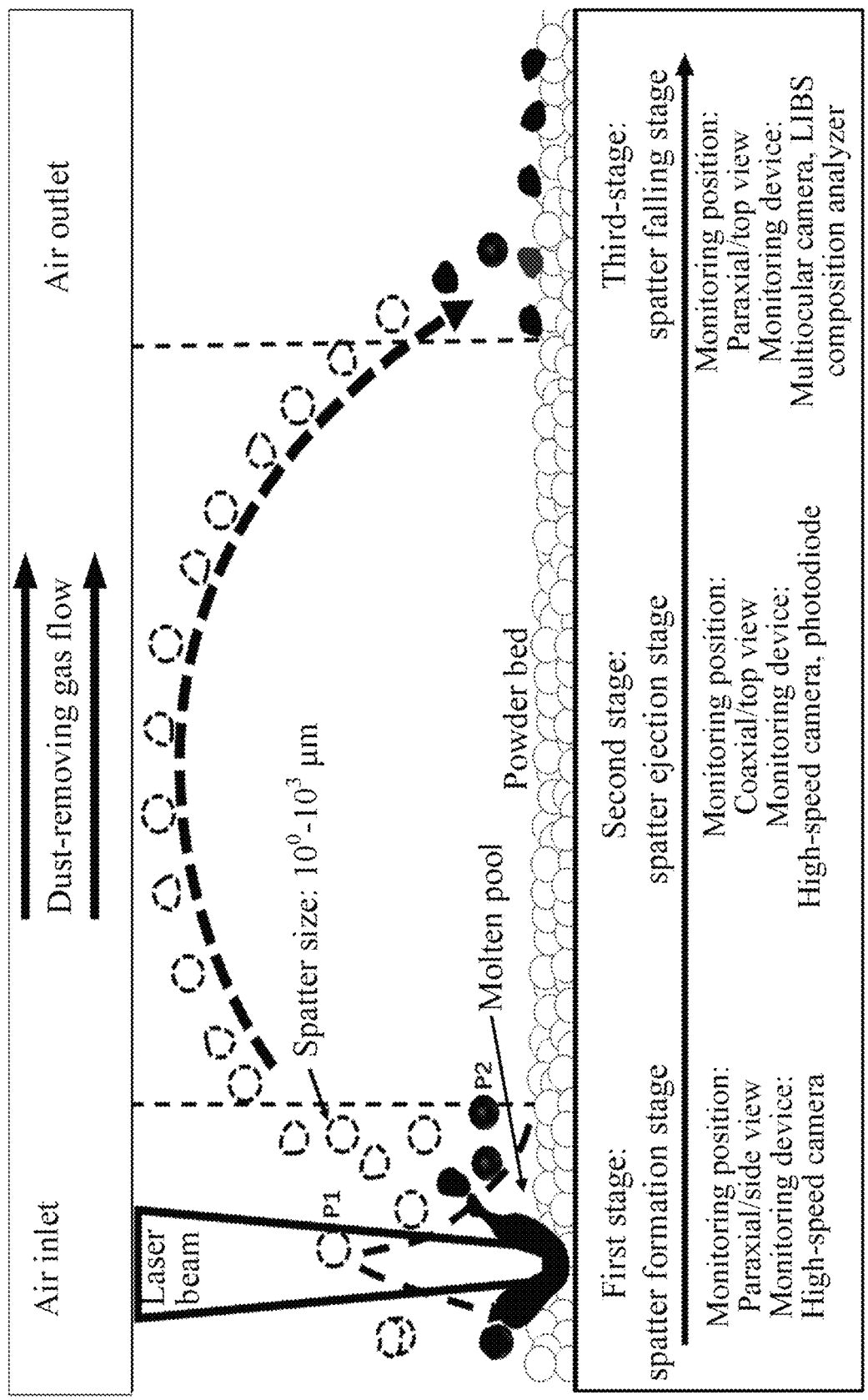
FIG. 1 is a flowchart of a method for in-situ monitoring of a full cycle of spatter formation, ejection, and falling during laser additive manufacturing.

In order to make the objective, technical solutions and advantages of the present disclosure clearer, specific implementations of the present disclosure will be further described below in detail with reference to specific embodiments and accompanying drawings. If specific techniques or conditions are not indicated in an embodiment, a process is performed in accordance with techniques or conditions described in literature in this field or in accordance with a product specification. All of the used reagents or instruments which are not specified with manufacturers are conventional commercially-available products.

The term "spatter" in the present disclosure is a typical physical phenomenon of interaction between a high-energy beam and a material. Spatters originate from a molten pool and a vicinity thereof, and generally include vapor condensate, high-temperature droplet spatters, and room-temperature powder spatters. The spatters have a particle size ranging from nanometers to hundreds of microns, and a number and distribution thereof are related to a process and an environmental atmosphere. In the present disclosure, the spatter refers to "spatter" in powder bed fusion (PBF) or direct energy deposition (DED). According to the present disclosure, "spatters" are used as "in-situ tracing particles", and a dynamic behavior of spatter particles is monitored and a kinematic behavior and a falling distribution of the spatter particles are counted by means of a multiocular high-speed high-resolution photographing technology. Radiation changes of spatter particles from formation to the falling motion process are monitored by means of an optical detection technology. Composition and content information of falling spatters is analyzed online by a LIBS online analysis system.

During specific implementation, according to spatter characteristics in L-PBF forming, the "full cycle" is divided into three stages: (1) a spatter formation stage, (2) a spatter ejection stage, and (3) a spatter falling stage. In-situ monitoring of spatters in the three stages is helpful to in-depth exploration and mastering of the spatter formation mechanism and the correlation between spatters and defects, and the influence of the spatters on forming quality.

(1) In the spatter formation stage, spatters feature a small sample size, intra-layer occurrence, dynamic, short forming time, and the like, and refer to spatters formed near the molten pool. For example, cold spatters and hot spatters are generated at positions close to the molten pool. A clear spatter formation process can be implemented by using a multiocular paraxial high-speed camera with a high temporal-spatial resolution in combination with ultra-high frame rate in-situ monitoring of an illumination source.

(2) In the spatter ejection stage, spatters feature a large sample size, intra-layer occurrence, dynamic, long ejection time, and the like, and refer to spatters away from a powder bed after ejection. A number and motion state of the spatters significantly affect internal defects of parts. A spatter trajectory, an ejection velocity and an ejection angle can be obtained by in-situ monitoring to study an internal correlation between the spatters and defects. An in-situ detection system with long monitoring time and a high frame rate and a laser path using multiple sensors are used to capture flying of the spatters. High throughput data during L-PBF can be used for statistical analysis of spatter characteristics. In order to reduce the processing pressure of a monitoring system, only hot spatters can be monitored in this stage.

(3) In the spatter falling stage, spatters feature a large sample size, inter-layer occurrence, static, need for a high spatial resolution, and the like, and refer to spatters falling to the powder bed. The spatters eventually re-deposit on the powder bed and parts, which will inevitably affect the powder spreading process and part quality. High-quality images of powder and parts can be obtained by layer-by-layer in-situ monitoring by cameras with a large FOV and a high spatial resolution. A LIBS online analysis system can obtain composition and content information of falling spatters. An algorithm is used to extract image data and determine sizes and positions of the falling spatters.

Characteristics of the spatter formation stage, the ejection stage and the falling stage and in-situ monitoring characteristic parameters are shown in Table 1.

TABLE 1

| Characteristic parameter | 1. Formation stage | 2. Ejection stage | 3. Falling stage |
|---|---|---|---|
| Number of spatters | $10-10^3$ | $10^3-10^5$ | None, with spatters having fallen |
| Spatter type | Room-temperature cold spatters and high-temperature hot spatters | Room-temperature cold spatters and high-temperature hot spatters | None, with spatters having fallen |
| Monitoring axial position | Paraxial/side view | Coaxial/top view | Paraxial/top view |
| Spatter velocity | $10^{-1}-10^2$ m/s | $10^1-10^2$ m/s | Relative static |
| Temporal resolution | 100k-10M kHz | 10k-100 kHz | 1-10 Hz |
| Spatter size | $10^2-10^3$ μm | $10^2-10^3$ μm | $10^2-10^3$ μm |
| Spatial resolution | Micron scale | Micron scale | Micron scale |
| FOV range | Local area, $10^0-10^1$ mm$^2$ | Local area, $10^1-10^2$ mm$^2$ | Full field with $10^2$ mm$^2$ |

In some implementations, a laser additive manufacturing apparatus may be an L-PBF device, including a laser, a beam expander, a scanning galvanometer, an f-θ focusing mirror, and a forming cavity. The forming cavity is a closed cavity, and a top thereof is provided with a window for allowing processing laser light and illumination laser light to transmit into the forming cavity. A powder bed is arranged at a bottom of the forming cavity. The processing laser light generated by the laser reaches the powder bed inside the forming cavity through the beam expander, the scanning galvanometer and the f-θ focusing mirror, forming a molten pool, and generating vapor and spatters. The laser of the L-PBF device is an IPG YLS-2000-SM fiber laser, with maximum average power of 2000 W and a wavelength of 1064±10 nm. The laser light reaches a powder bed area through an optical path system composed of a beam expanding collimator with a focal length f=200 mm, a HurrySCAN scanning galvanometer, and an f-θ mirror with a focal length f=500 mm.

In in-situ monitoring of the intra-layer spatter formation stage, illumination laser light generated by the illumination source reaches the powder bed of the forming cavity, and light spots thereof should cover the molten pool, the vapor, the spatters and other areas on the powder bed. Detection light reflected by the powder bed reaches a visual sensor of a high-speed camera through an optical filter and a telephoto microlens, forming a motion image of spatters.

In in-situ monitoring of the intra-layer spatter ejection stage, illumination laser light generated by the illumination source reaches the powder bed of the forming cavity, and light spots thereof should cover the molten pool, the vapor, the spatters, and other areas on the powder bed. Detection light reflected by the powder bed reaches a photodiode sensor to form a spatter radiation characteristic map. Reflected detection light reaches the visual sensor of the high-speed camera through the optical filter and the telephoto microlens, forming a motion trajectory of spatters.

In in-situ monitoring of interlayer spatter falling, illumination light generated by the illumination source reaches the powder bed of the forming cavity, and should cover a full-field area of the powder bed. Detection light reflected by the powder bed reaches a multiocular lens sensor to form a spatter falling distribution map. An online LIBS composition analysis apparatus obtains composition and content information of falling spatters.

In some implementations, a powdered material with a moderate particle size is selected. If the particle size is too large, an effect of gas-solid interaction is not obvious. If the particle size is too small, it is not easy to observe. The powder particle size is preferably 10-500 μm.

In some implementations, the paraxial multiocular high-speed photographing apparatus is provided with a high-speed camera and a paraxial laser illumination source. Specifically, the paraxial multiocular high-speed photographing apparatus may have a temporal resolution of 0.1-10 μs and a spatial resolution of 1-10 μm/pixel, with a sampling time that may be $10^2$-$10^3$ μs at each layer.

In some implementations, the coaxial monocular high-speed photographing apparatus is provided with a high-speed camera and a coaxial laser illumination source. Specifically, the coaxial monocular high-speed photographing apparatus may have a temporal resolution of 10-100 μs and a spatial resolution of 10-100 μm/pixel, with a sampling time that may be $10^1$-$10^3$ s at each layer.

The paraxial laser illumination source and the coaxial laser illumination source can not only clearly observe high-temperature hot spatters, but also observe relatively low-temperature cold spatters. The laser illumination sources each have peak power of 100-500 W, a wavelength of 640±10 nm or 810±10 nm, and pulse duration of 20-2,000 ns.

In some implementations, vapor recoil pressure generated by laser heating of powder leads to ejection of "liquid-based" droplet spatters from the molten pool, and ejection of "solid-based" powder spatters from a substrate caused by inert entrainment gas flow induced by an entrainment effect of metal vapor. The high-speed photographing apparatus monitors a kinematic behavior of ejected spatters, and a photodiode detects radiation characteristics of the ejected spatters.

FIG. 1 is a monitoring flowchart of a method for in-situ monitoring of a full cycle of spatter formation, ejection, and falling during laser additive manufacturing.

The method includes in-situ monitoring of an intra-layer spatter formation stage, in-situ monitoring of an intra-layer spatter ejection stage, and in-situ monitoring of interlayer spatter falling.

Figure 2:
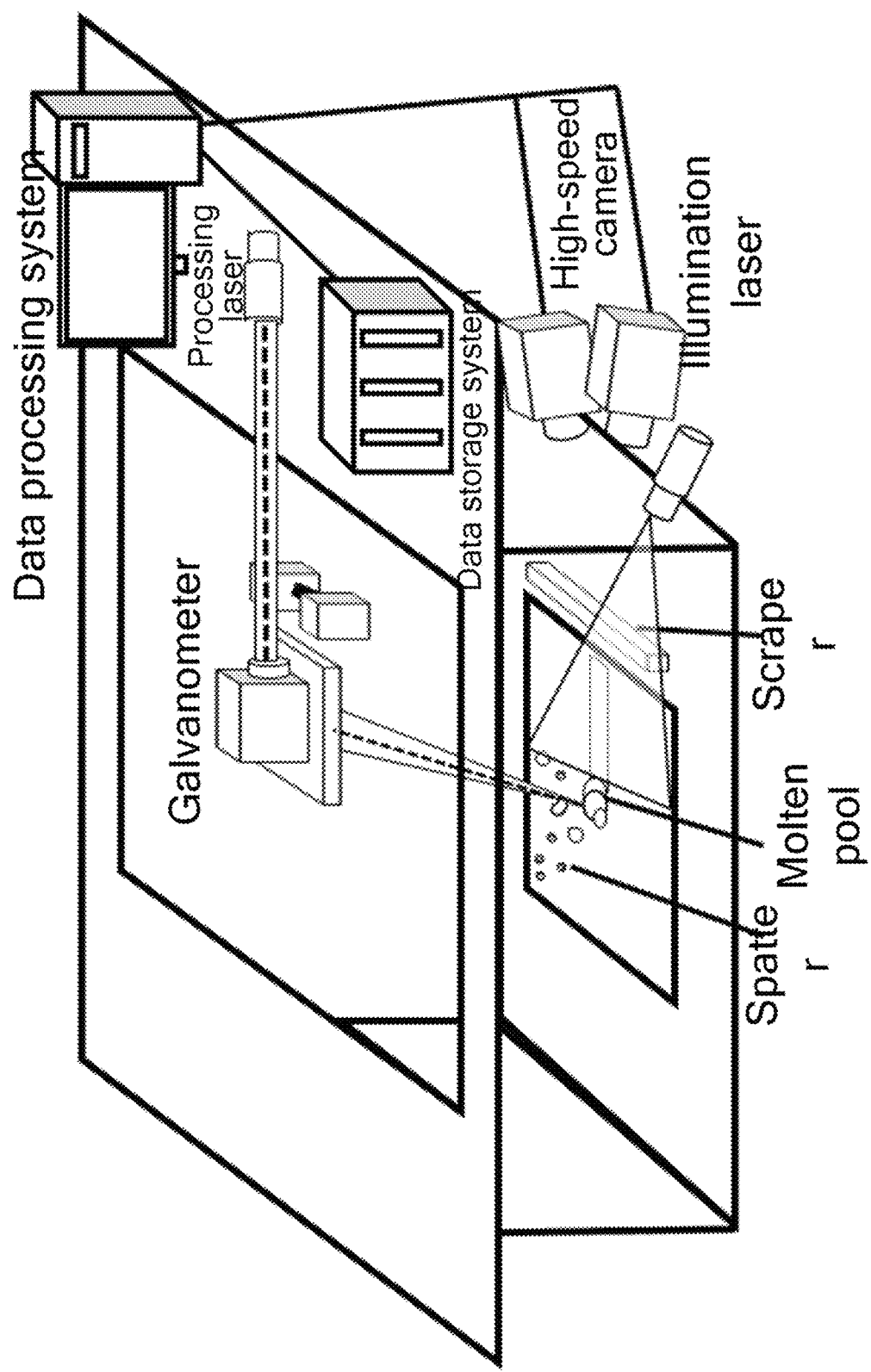
FIG. 2 is a schematic diagram showing "in-situ monitoring of a spatter formation stage in L-PBF additive manufacturing" in an example of the present disclosure.

(1) For the in-situ monitoring of the intra-layer spatter formation stage, as shown in FIG. 2, a paraxial multiocular high-speed photographing apparatus is paraxially arranged at the laser additive manufacturing apparatus, and specifically includes high-speed camera and a laser illumination source, with a spatial resolution of 3.7 μm/pixel and a temporal resolution of 190 ns. The apparatus uses two Phantom V2012 high-speed cameras, with a photographing included angle of 20°, an experimental acquisition frequency of 100 kfps, an exposure time of 1 μs, and a resolution of 512× 320 pixels. A CAVILUX high-power pulsed semiconductor laser illumination source synchronized with the high-speed camera is provided, with a laser pulse width set to 190 ns and single pulse energy set to 95 μJ, which can reduce a heat-affected zone and improve an imaging contrast. In addition, a Thorlabs narrow-band filter with a wavelength of 810±10 nm is further provided at a front end of a high-speed camera lens.

Figure 3:
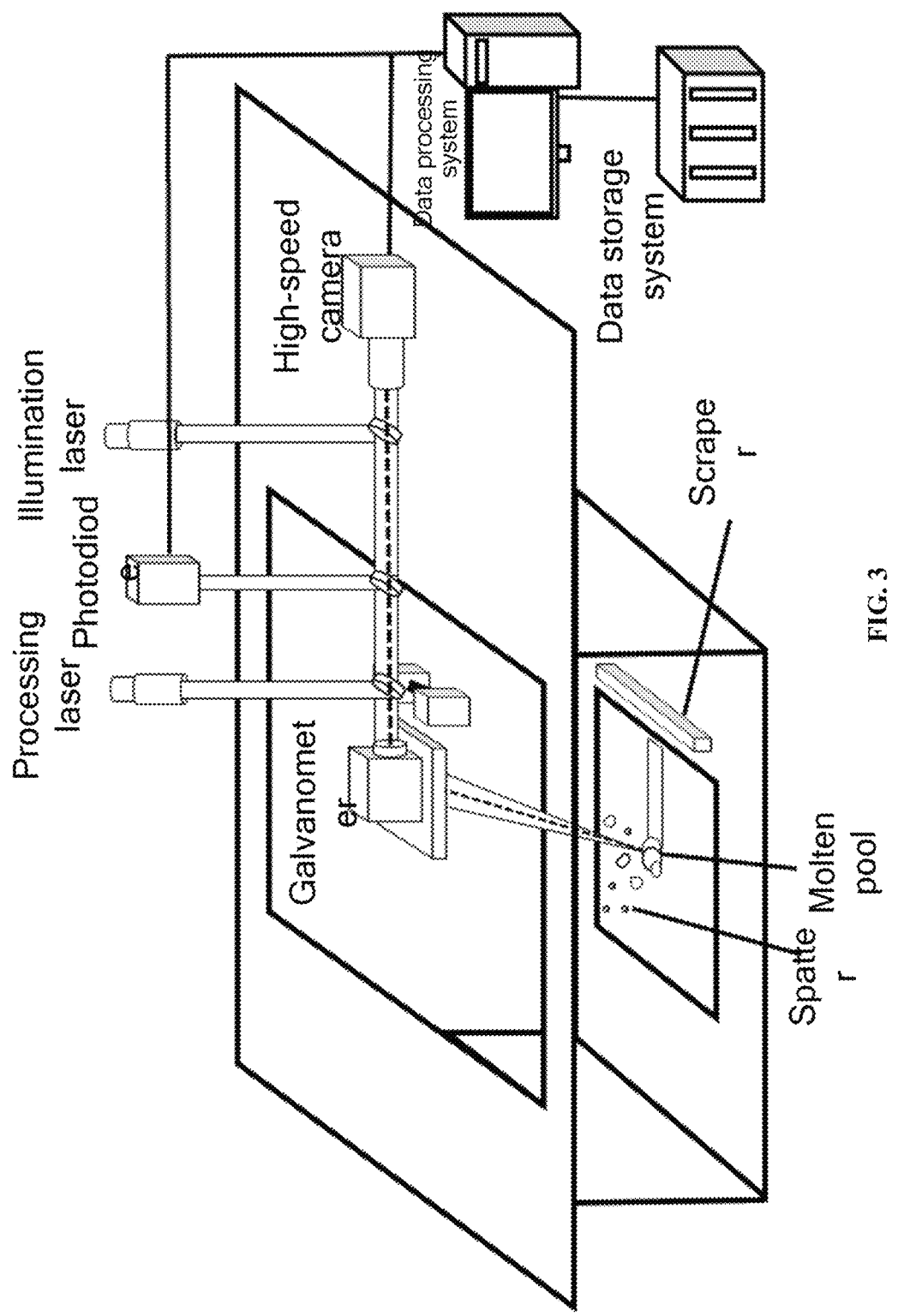
FIG. 3 is a schematic diagram showing "in-situ monitoring of a spatter ejection stage in L-PBF additive manufacturing" in an example of the present disclosure.

(2) For the in-situ monitoring of the intra-layer spatter ejection stage, as shown in FIG. 3, a coaxial monocular high-speed photographing apparatus and a photoelectric sensor, specifically including a high-speed camera, a photoelectric sensor and a laser illumination source, are coaxially arranged at the laser additive manufacturing apparatus, with a spatial resolution of 10 μm/pixel and a temporal resolution of 190 ns. The apparatus uses a Phantom V2012 high-speed camera, with an experimental acquisition frequency of 1 kfps, an exposure time of 1 μs, a resolution of 512× 320 pixels, and an acquisition time of $10^1$-$10^3$ s at one layer. A photodiode used is a Thorlabs PDA100A2 silicon photodetector, with a bandwidth of 11 MHz, a wavelength range of 320-1100 nm, and an acquisition frequency of 1 kfps. A CAVILUX high-power pulsed semiconductor laser illumination source synchronized with the high-speed camera is provided, with a laser pulse width set to 190 ns and single pulse energy set to 95 μJ, which can reduce a heat-affected zone and improve an imaging contrast. In addition, a Thorlabs narrow-band filter with a wavelength of 810±10 nm is further provided at a front end of a high-speed camera lens.

Figure 4:
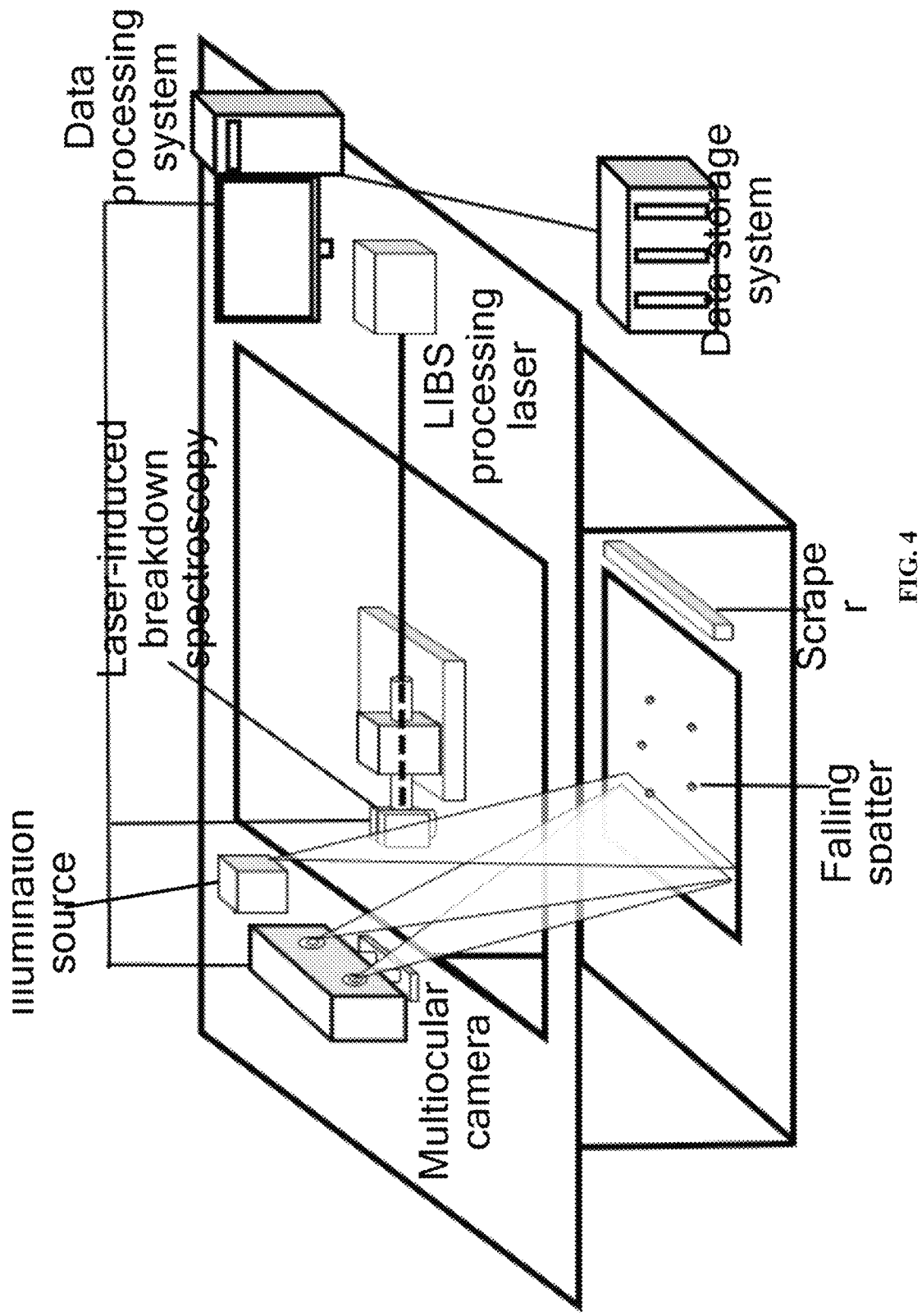
FIG. 4 is a schematic diagram showing "in-situ monitoring of a spatter falling stage in L-PBF additive manufacturing" in an example of the present disclosure.

(3) For the in-situ monitoring of interlayer spatter falling, as shown in FIG. 4, a multiocular photographing apparatus is paraxially arranged at the laser additive manufacturing apparatus, and specifically includes a multiocular camera, an online LIBS composition analysis apparatus, and an illumination source. The apparatus uses the multiocular camera, with a spatial resolution of 3.7 μm/pixel, an experimental acquisition frequency of one image per layer, an exposure time of 0.1 s, and a resolution of 512× 320 pixels.

With reference to the flow shown in FIG. 1, the in-situ monitoring of the full cycle of spatter formation, ejection, and falling in laser additive manufacturing can be completed. After the monitoring, available data includes a dynamic behavior (a velocity, an acceleration and an angle) and morphological characteristics of spatters, a motion trajectory of spatter ejection, a number of the spatters, thermal radiation characteristics of the spatters, distribution characteristics of falling spatters, and composition and content information of the falling spatters. A statistical method may be used to process the above data, explore evolution and formation of cracks, holes, deformation, and the like in laser additive manufacturing, establish an internal relationship of "composition, process, and performance" and achieve quality control of components and traceability of process data. There are many statistical methods, which are not limited herein.

Embodiment 1

In this embodiment, gas atomized AlSi10Mg aluminum alloy spherical powder was used, with a particle size ranging from 19.9 μm to 53.9 μm as measured by Mastersizer3000, and with an average particle size of 32.8 μm. Table 2 shows the chemical composition of the AlSi10Mg aluminum alloy powder.

TABLE 2

| Chemical composition of the AlSi10Mg aluminum alloy used in an experiment | | | | | | | |
|---|---|---|---|---|---|---|---|
| Si | Fe | Cu | Mn | Mg | Zn | Ti | Al |
| 9.15 | 0.18 | 0.015 | 0.225 | 0.30 | 0.01 | 0.011 | Bal. |

An in-situ monitoring apparatus shown in FIG. 2 was used. An in-situ monitoring process in a spatter formation stage included the following steps.

In step S1, AlSi10Mg aluminum alloy spherical powder was spread onto a substrate of an L-PBF additive manufacturing apparatus, and covered a laser travel path range to manufacture a powder bed.

In step S2, two high-speed cameras were paraxially arranged in a molten pool area of an L-PBF device, so that an image FOV thereof covered a high-energy beam irradiated area and a vicinity thereof.

In step S3, a laser of the L-PBF device was started, and the powder bed manufactured in step S1 was scanned by the laser according to a planned path.

In step S4, a photoelectric sensor and a high-speed photographing apparatus were calibrated by experiment and mathematical transformation.

In step S5, a dynamic behavior of spatters above the molten pool was observed by the two high-speed cameras.

In step S6, with reference to a 3D motion trajectory of spatter particles obtained in step S5, a motion "velocity-angle-time" curve of the spatter particles was obtained, so as to obtain a dynamic behavior of the spatter particles in an ejection stage.

It should be noted that the two high-speed cameras of a binocular vision sensing apparatus was at an angle of 20°, and the observation and measurement of the spatter motion trajectory were performed in 3D space. In order to improve clarity of interaction between laser light and material in L-PBF forming, image sharpness of droplet spatters and powder spatters was improved by means of an image filtering algorithm in experimental results. In addition, ImageJ1.53 was used to track the motion trajectory of spatters and the molten pool frame by frame, and then a number and sizes of spatters, a spatter ejection angle and ejection velocity, and other physical quantities were calculated. The applicant defined that a "vertical component of the ejection velocity" of the molten pool and spatters in L-PBF forming was positive vertically; a "horizontal component of the ejection velocity" meant that a traveling direction (horizontal to the right) of the laser molten pool was positive; and the "ejection angle" referred to an included angle between a motion direction of spatters and the traveling direction of the laser molten pool.

Figure 5:
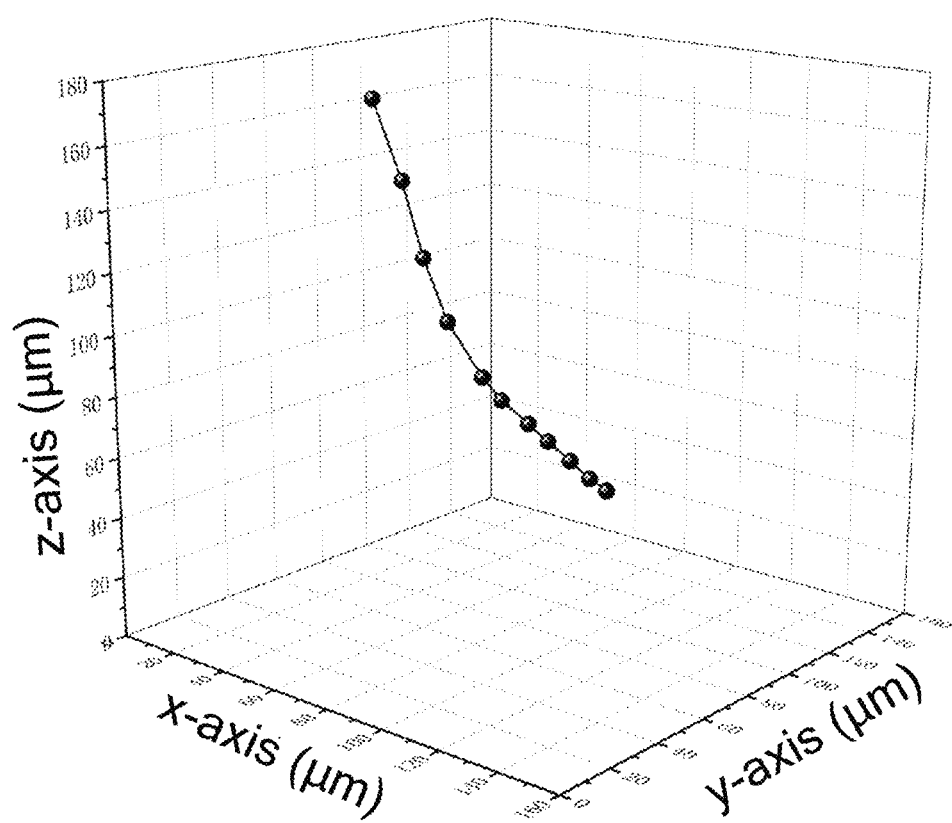
FIG. 5 is a 3D motion trajectory diagram of representative spatter particles in Embodiment 1 in a spatter formation stage.

FIG. 5 is a 3D motion trajectory diagram of representative spatter particles not deflected and collected in L-PBF forming in Embodiment 1.

A representative spatter (P1) was selected from FIG. 5 to study a dynamic behavior. After five measurements, it can be seen that the spherical spatter particle had an average radius r of 14.2 μm. The spatter particle moved in a vapor ejection direction under the entrainment effect of metal vapor.

Figure 6:
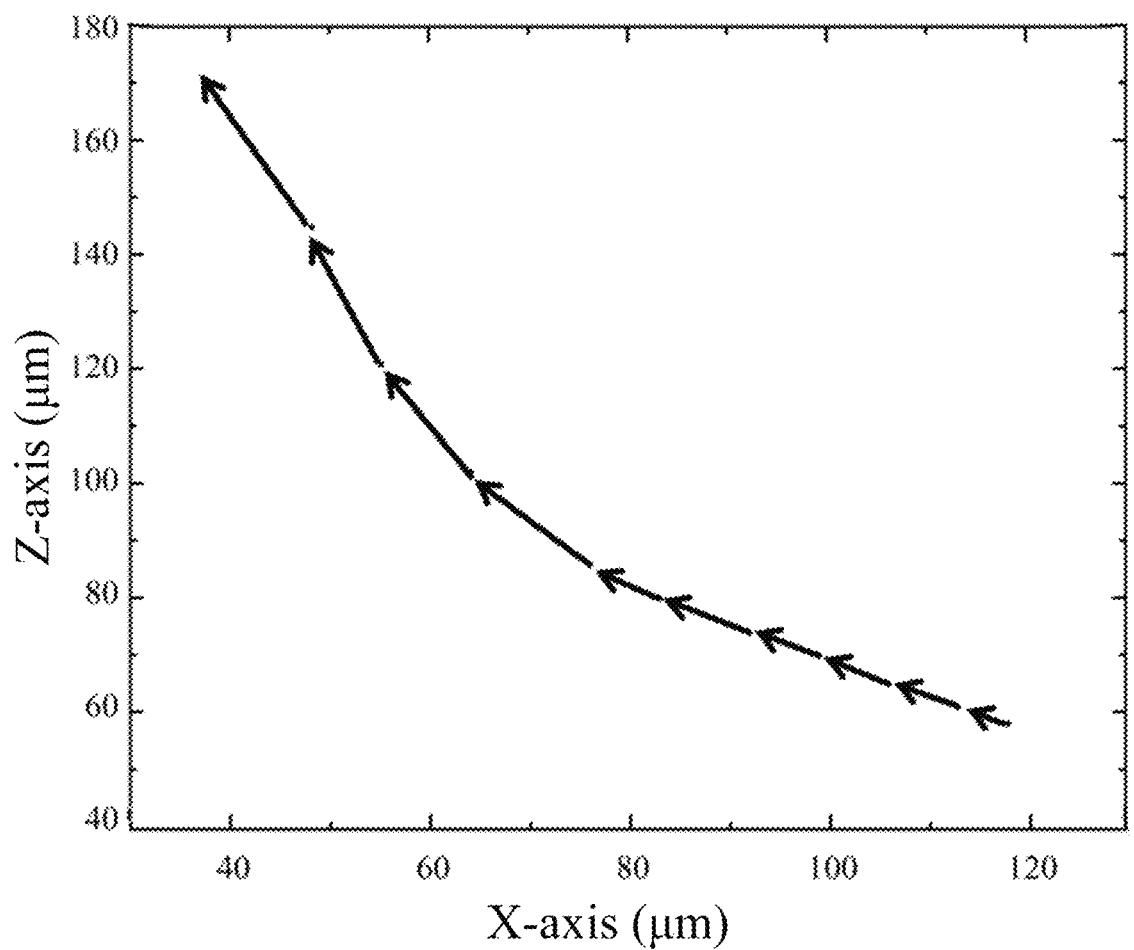
FIG. 6 is a vector diagram of an ejection trajectory of a representative spatter particle in Embodiment 1 in the spatter formation stage.
Figure 7:
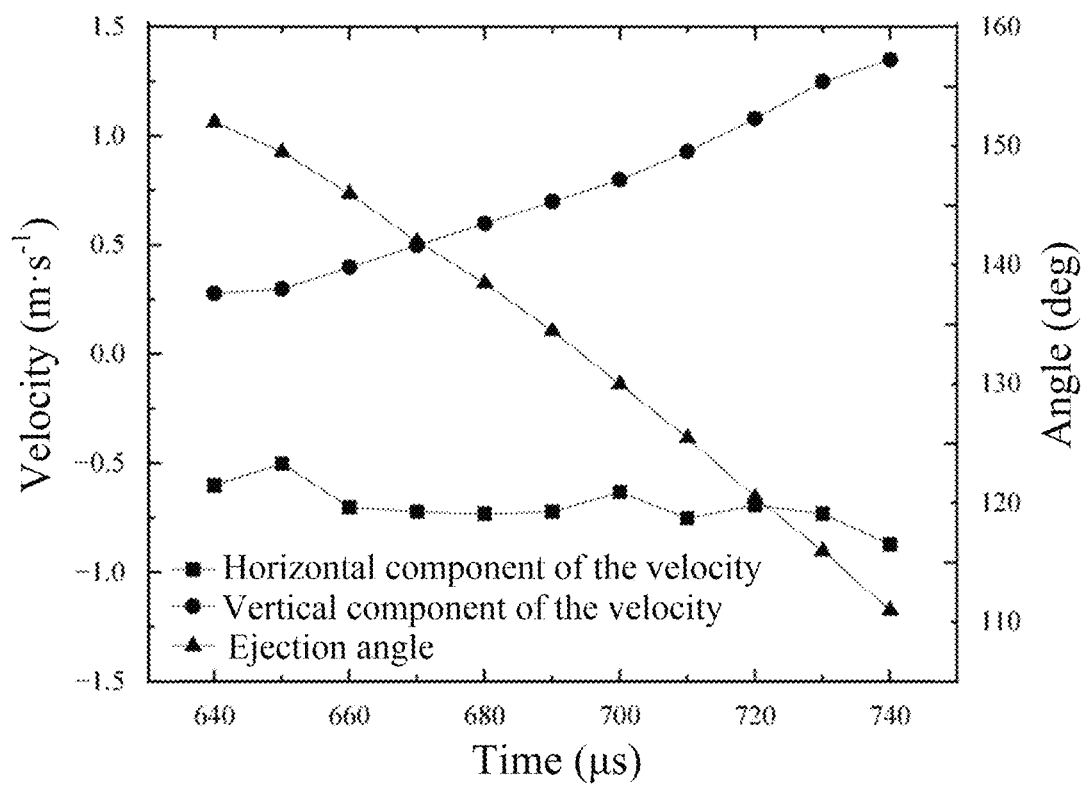
FIG. 7 is a motion "velocity-angle-time" curve diagram of the representative spatter particle in Embodiment 1 in the spatter formation stage.

FIG. 6 is a vector diagram of a trajectory formed by the spatter particle P1 at a laser power density EV=100 J·mm$^{-3}$. FIG. 7 is a motion "velocity-angle-time" curve diagram of the spatter particle P1, with an angle in a laser motion direction being 0° and an angle in a deposition direction being 90°. When t=650 μs after laser light emission, the spatter had an ejection angle of about 149.5°, a vertical component $u_v$ of ejection velocity=0.28 m·s$^{-1}$, and a horizontal component $u_h$ thereof=−0.49 m·s$^{-1}$. According to Newton's second law, a formula for calculating a force acting on the spherical spatter particle is as follows:

$$F = ma = \frac{4}{3}\rho\pi r^3 \alpha$$

where m is particle mass, ρ is a molten liquid density of the particle, r is a particle radius, and a is a particle acceleration. A maximum value of a vapor lifting force $F_{lift}$ of the spatter particle P1 in the spatter formation stage was calculated to be 2.39 μN.

Embodiment 2

Different from that in Embodiment 1, deflected representative spatters were selected in Embodiment 2 for research.

Figure 8:
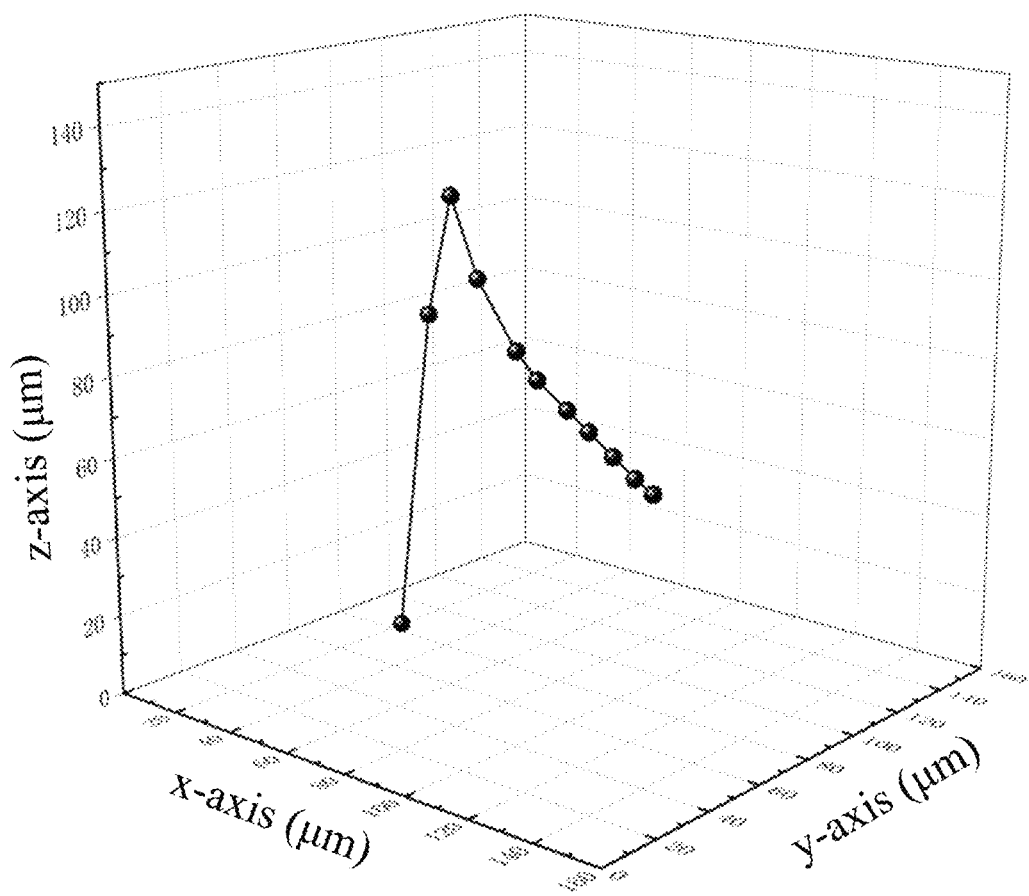
FIG. 8 is a 3D motion trajectory diagram of a representative spatter particle in Embodiment 2 in a spatter formation stage.

FIG. 8 is a 3D motion trajectory diagram of deflected representative spatter particles collected in L-PBF forming in Embodiment 2.

A representative spatter (P2) was selected from FIG. 8 to study a dynamic behavior.

FIG. 8 is a diagram showing motion trajectory deflection of the spatter particle (P2) caused by a vapor recoil force generated by laser irradiation on an upper surface of the spatter particle in L-PBF forming. After five measurements, it can be seen that the spherical spatter particle had an average radius r of 14.5 μm. The spatter particle moved in a vapor ejection direction under the entrainment effect of metal vapor. When passing through a laser beam (t=720 μs), the spatter particle was quickly heated and became a bright molten spatter or spark. Due to the large recoil pressure of vapor plume, the motion trajectory of the high-temperature particle would change dramatically.

Figure 9:
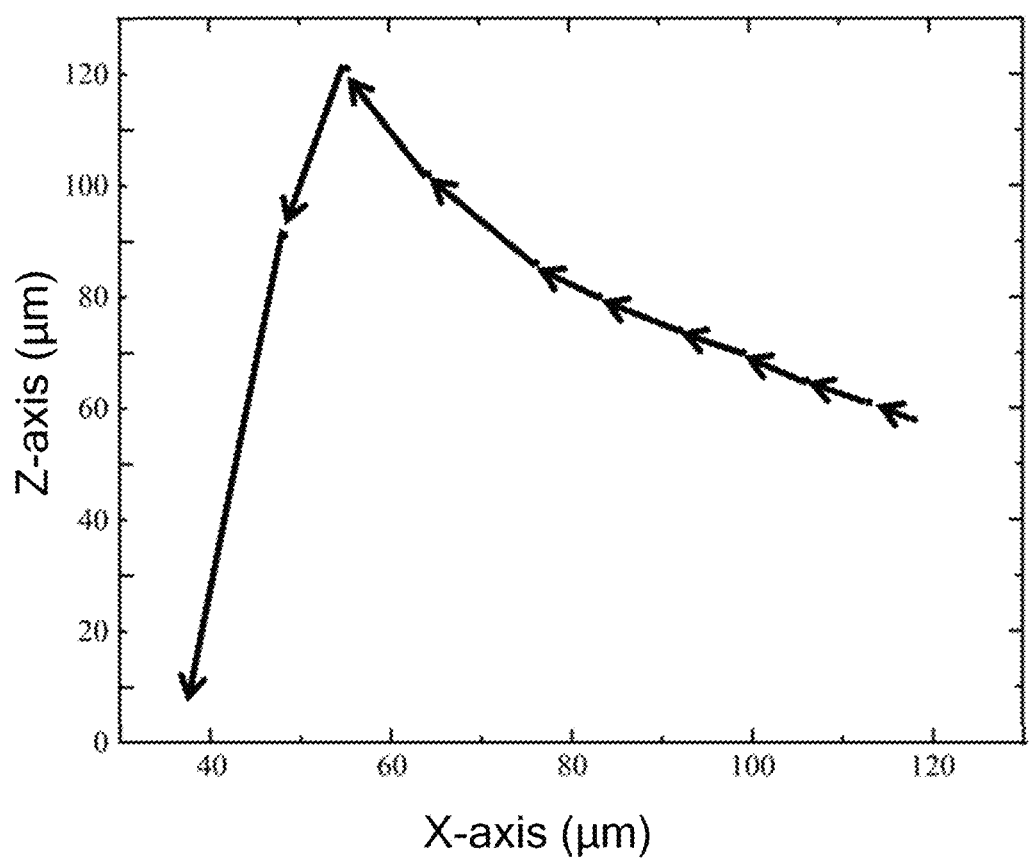
FIG. 9 is a vector diagram of an ejection trajectory of the representative spatter particle in Embodiment 2 in the spatter formation stage.
Figure 10:
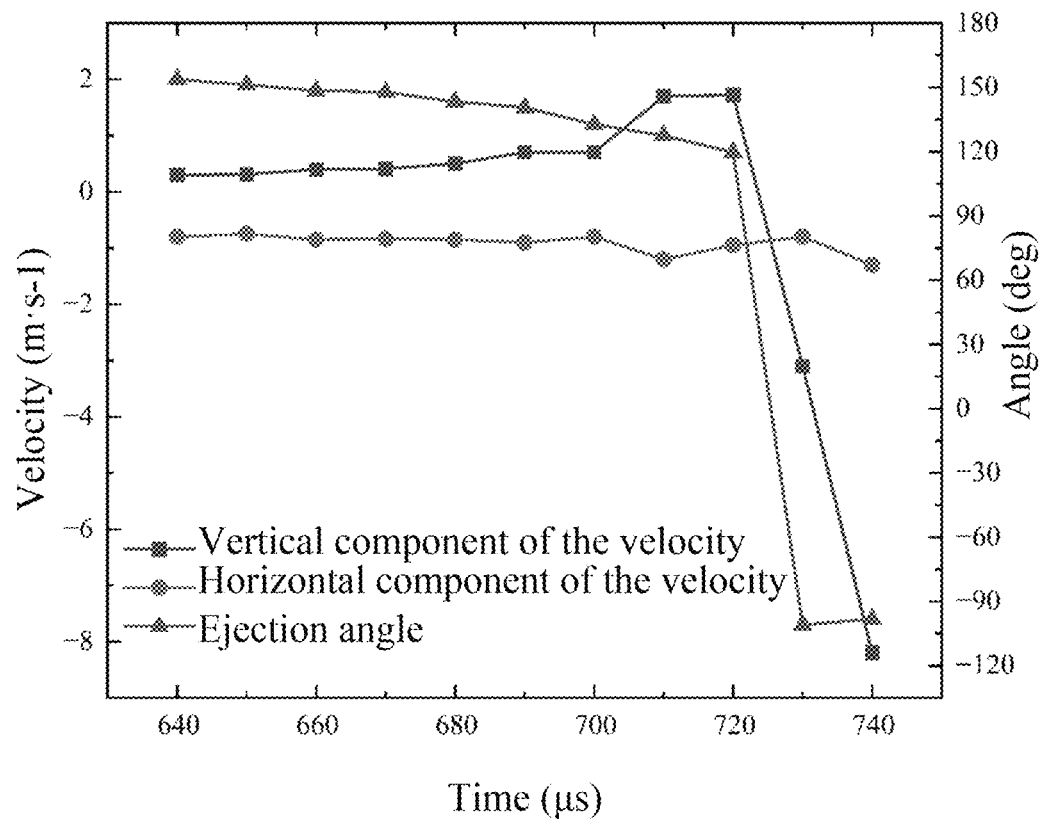
FIG. 10 is a motion "velocity-angle-time" curve diagram of the representative spatter particle in Embodiment 2 in the spatter formation stage.

FIG. 9 is a vector diagram of a trajectory formed by the spatter particle P2 at a laser energy density EV=100 J·mm$^{-3}$. FIG. 10 is a motion "velocity-angle-time" curve diagram of the spatter particle P2, with an angle in a laser motion direction being 0° and an angle in a deposition direction being 90°. When t=650 μs after laser light emission, the spatter had an ejection angle of about 152.5°, a vertical component $u_v$ of ejection velocity=0.32 m·s$^{-1}$, and a horizontal component un thereof=−0.49 m·s$^{-1}$ (a negative value indicated a direction opposite to the laser motion direction). When the laser beam approached the particle P2, due to a lifting effect of the metal vapor plume, when t=700 μs, the ejection angle changed to 135.4°, the horizontal component of the ejection velocity was −0.57 m·s$^{-1}$, the vertical component thereof increased to 0.71 m·s$^{-1}$, and a vapor lifting acceleration was 0.78×10$^5$ m·s$^{-2}$. According to Newton's second law, a formula for calculating a force acting on the spherical spatter particle is as follows:

$$F = ma = \frac{4}{3}\rho\pi r^3 \alpha$$

where m is particle mass, ρ is a molten liquid density of the particle, r is a particle radius, and a is a particle acceleration. A maximum value of a vapor lifting force $F_{lift}$ of the spatter particle P1 in the spatter formation stage was calculated to be 1.59 UN.

As the laser light moved, the spatter particle entered a laser-irradiated area and turn into an incandescent state at t=720 μs under laser irradiation. The temperature rose sharply, and when it reached a boiling point Tb, an upper portion of the particle begins to boil. The generated metal vapor applied downward recoil pressure on the particle, so that a motion trajectory thereof changed dramatically. As shown in FIGS. 10, in a very short time at t=710-730 μs), the ejection angle of the particle changed from 124.9° to −103.0°, and the vertical component $u_v$ of the ejection velocity changed from 1.6 m·s$^{-1}$ to −3.1 m·s$^{-1}$. An acceleration $a_p$ of the particle can be calculated by taking the derivative of "velocity-time". At a turning point of the motion trajectory of the particle P2 (t=730 μs), the maximum acceleration in the vertical direction was −4.9×10$^5$ m·s$^{-2}$. By comprehensive consideration of a vapor lifting force $F_{lift}$ in the vertical direction, a vapor recoil force $F_{recoil}$, and gravity of the spatter particle in this stage, the maximum value of the vapor recoil force $F_{recoil}$ acting on the spherical particle in this stage was calculated to be 11.49 μN based on formula 1.

The dynamic behavior of the representative spatter particle in FIG. 10 was measured and calculated by using the above method, and measured data was fitted by using a statistical method, so that data closer to a real value can be obtained.

Embodiment 3

The powdered material is the same as that in Embodiment 1.

An in-situ monitoring apparatus shown in FIG. 3 was used. An in-situ monitoring process in a spatter ejection stage included the following steps.

In step (1), AlSi10Mg aluminum alloy spherical powder was spread onto a substrate of an L-PBF additive manufacturing apparatus, and covered a laser travel path range to manufacture a powder bed.

In step (2), a photoelectric sensor and a high-speed photographing apparatus are arranged at a top of a forming cavity of an L-PBF device to be coaxial with a processing laser.

In step (3), a laser of the L-PBF device was started, and the powder bed manufactured in step S1 was scanned by the laser according to a planned path.

In step (4), a photoelectric sensor and a high-speed photographing apparatus were calibrated by experiment and mathematical transformation.

In step (5), spatter radiation characteristics were detected by means of a photodiode.

In step (6), a motion trajectory of spatters above a molten pool was observed and counted by means of the high-speed photographing apparatus.

In step (7), with reference to the radiation characteristics of spatter particles during 3D printing obtained in step S5, change data of the spatter radiation characteristics during 3D printing were obtained.

Figure 11:
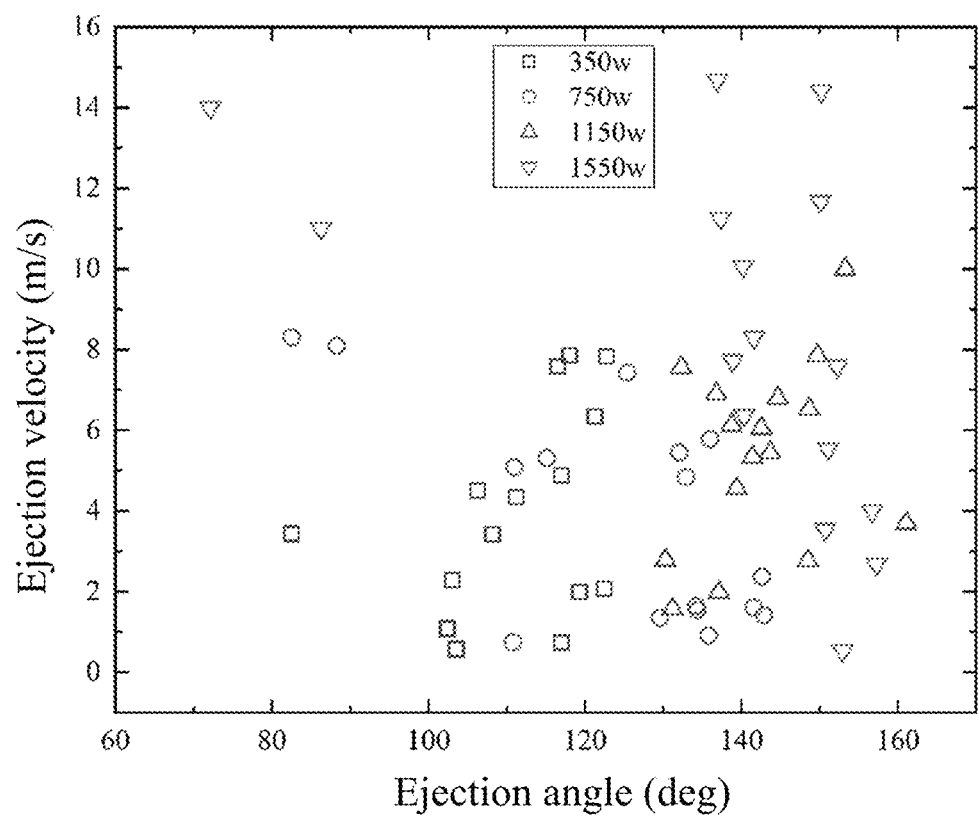
FIG. 11 is a diagram showing a velocity and an angle of a spatter ejection stage under different laser powers in Embodiment 3 in the ejection stage.

As shown in FIG. 11, a motion trajectory of some spatters under different energy densities in special circumstances (during 3D printing of a component close to an air outlet) was counted, to obtain an ejection angle and velocity of the spatters. An average ejection velocity and an average ejection angle increased with the increase in energy density. For a laser line energy density of 700 J/m, the average velocity of spatter ejection ranged from 0.23 m/s to 8.95 m/s, with an average value of 3.35 m/s. For a laser line energy density of 2100 J/m, the average velocity of spatter ejection ranged from 1.56 m/s to 22.78 m/s, with an average value of 7.89 m/s. Most spatters were ejected toward the rear of a laser scanning path, while a minority of spatters were ejected along the front of the laser scanning path. When the laser line energy density was 700 J/m, the average ejection angle θ of spatters ranged from 83.97° to 126.82°, with an average value of 115.23°. When the laser line energy density was 1,400 J/m, the average ejection angle θ of spatters ranged from 84.01° to 152.98°, with an average value of 130.05°. When the laser line energy density was 2,100 J/m$^3$, the average ejection angle θ of spatters ranged from 50.26° to 163.11°, with an average value of 141.24°. When the laser line energy density was 2,800 J/m, the average ejection angle θ ranged from 70.98° to 175.03°, with an average value of 149.01°.

Figure 12:
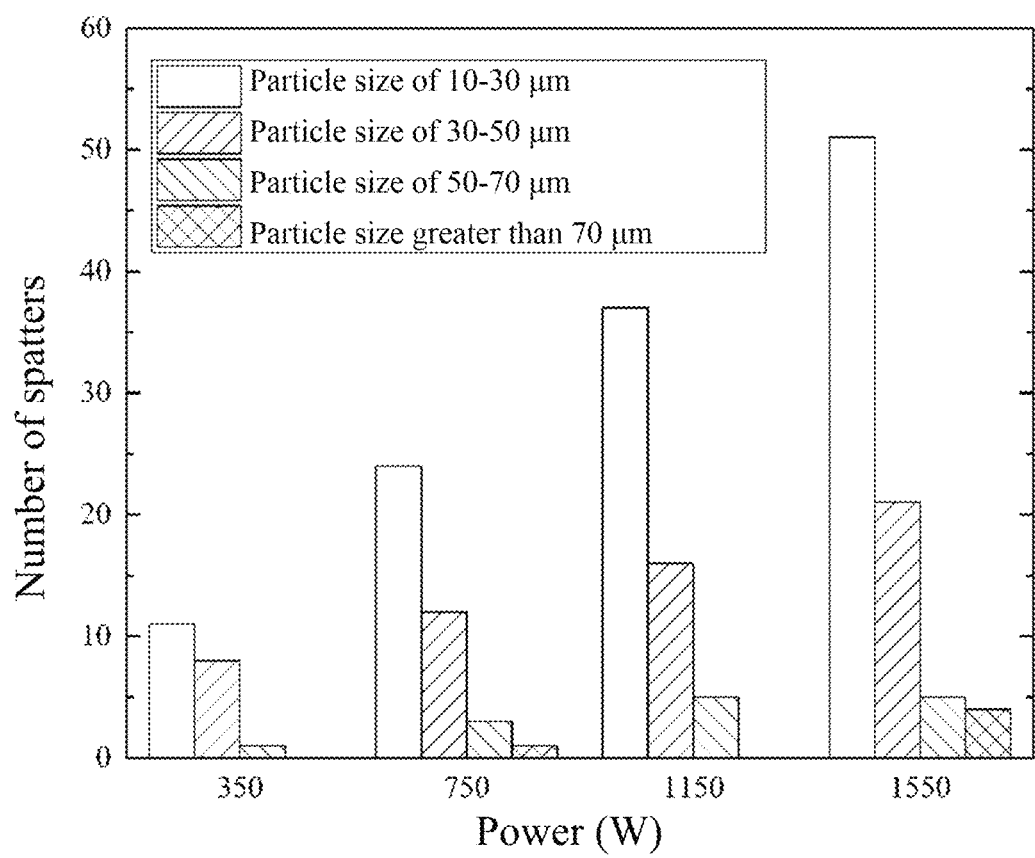
FIG. 12 is a particle size diagram in a spatter ejection stage under different laser powers in Embodiment 3 in the ejection stage.

FIG. 12 shows numbers and sizes of spatter particles at different energy densities. At least three frame-by-frame processing was performed for the measurement of the spatter diameter. The number and particle sizes of spatters increased with the increase in laser power.

Figure 13:
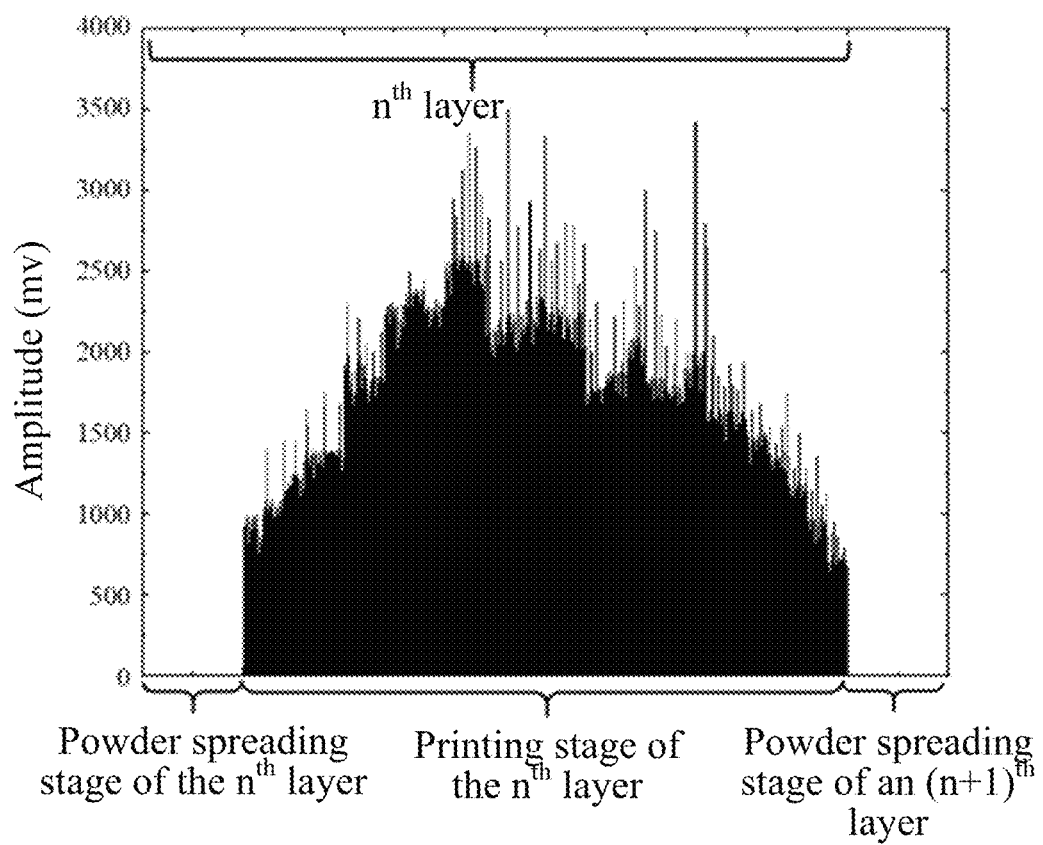
FIG. 13 is a diagram showing radiation data collected by a photodiode during 3D printing at an $n^{th}$ layer in Embodiment 3 in the ejection stage.

FIG. 13 shows radiation data of a layer during 3D printing collected by a photodiode, with the range of 0-5 s corresponding to radiation data collected in the powder spreading stage of an n$^{th}$ layer, the range of 5-35 s corresponding to radiation data collected in the n$^{th}$ layer, and the range of 35-40 s corresponding to radiation data collected in the powder spreading stage of an (n+1)$^{th}$ layer. The photodiode used was a Thorlabs PDA100A2 silicon photodetector, with a bandwidth of 2.4 MHz and a wavelength range of 340-1100 nm, to detect the radiation characteristics of the spatters. In order to prevent the introduction of a too wide band from affecting analysis and exclude reflected laser light (1064±10 nm) and interference thereof, a 400-950 nm band-pass filter was set to transmit visible light and near-infrared light near a radiation intensity peak to the photodiode, and the photodiode further converted an optical signal into an electrical signal for storage, thereby achieving monitoring of a spatter radiation intensity signal. The photodiode was sampled as f=10 Khz. During 3D printing, a system automatically collects data and associates the data with a number of print layers, and segments radiation data of different components in each layer, so as to compare and analyze radiation characteristics of spatters of different numbers of layers of the same component. Data obtained by laser scanning of one layer is saved as a file with a size of about 50 MB. Due to a large number of print layers during L-PBF, the volume of data obtained is large. Using raw data directly to calculate may consume a lot of computing resources and storage space, and it is very difficult to perform real-time classification. Therefore, further data processing, feature extraction and feature selection need to be performed for the data. A max-relevance and min-redundancy (MRMR) algorithm is used to extract features, and the importance of different features to spatters is scored and ranked.

Embodiment 4

In this embodiment, gas atomized Hastelloy X powder was used, with a particle size range measured by means of Mastersizer3000 to be 19 μm ($D_{10}$), 35 μm ($D_{50}$) and 58 μm ($D_{90}$). Table 3 shows the chemical composition of the Hastelloy X powder.

TABLE 3

Chemical composition of the Hastelloy X powder used in an experiment

| Cr | Fe | C | Mn | Si | Mo | Co | Al | W | Ni |
|---|---|---|---|---|---|---|---|---|---|
| 21.50 | 18.20 | 0.10 | 1.00 | 1.00 | 9.20 | 1.50 | 0.10 | 0.80 | Bal. |

An in-situ monitoring apparatus shown in FIG. 4 was used. An in-situ monitoring process in a spatter falling stage included the following steps.

In step (1), Hastelloy X powder was spread onto a substrate of an L-PBF additive manufacturing apparatus, and covered a laser travel path range to manufacture a powder bed.

In step (2), a paraxial static multiocular photographing apparatus was arranged at a top of a forming cavity of an L-PBF device, so that an image FOV thereof covered a full field of a processing area.

In step (3), a laser of the L-PBF additive manufacturing apparatus was started, and the powder bed manufactured in step S1 was scanned by the laser according to a planned path.

In step (4), the multiocular photographing apparatus was calibrated by experiment and mathematical transformation, to determine a correspondence between coordinates of a laser-irradiated area and coordinates of high-spatial-resolution imaging.

In step (5), a falling distribution of spatters was observed by means of the multiocular photographing apparatus, and composition and content information was obtained by an online LIBS composition analysis apparatus.

It should be noted that, in order to improve clarity of falling spatters in L-PBF forming, image sharpness of the falling spatters was improved by means of an image filtering algorithm in experimental results.

Figure 14:
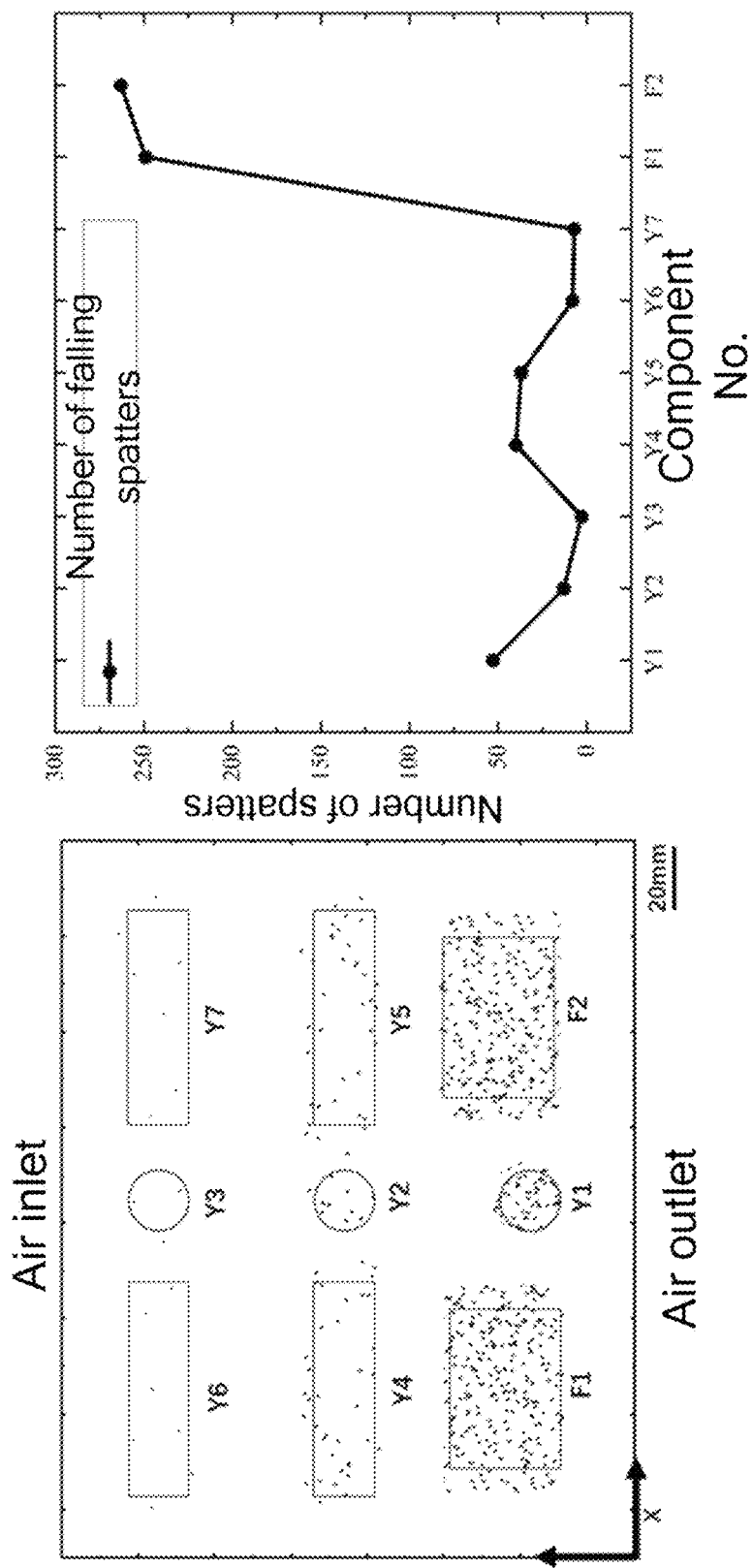
FIG. 14 is a diagram showing spatter falling distribution at an $n^{th}$ layer collected by a multiocular camera in Embodiment 4 in a falling stage.

FIG. 14 is a distribution diagram of falling spatters at an $n^{th}$ layer and a line diagram showing a number of falling spatters on different components. In Embodiment 4, a multiocular camera was used to collect falling spatters at a frequency of one image at each layer, with an exposure time of 0.1 s, and a resolution of the collected images being 125 μm/pixel. In each image obtained by a monitoring system, a detector was constructed to determine whether there is a spatter redeposit and a position thereof and to quantify an incidence of the spatter redeposit.

An intensity value of pixels in the captured image is denoted as I(x, y), and a Laplace operator L(x, y) corresponding thereto is as follows:

$$L(x, y) = \frac{\partial^2 I}{\partial x^2} + \frac{\partial^2 I}{\partial y^2} \quad (1)$$

A function expression of a two-dimensional Laplacian of Gaussian (LoG) operator with 0 as a center and σ as a Gaussian standard deviation is as follows:

$$LoG(x, y) = -\frac{1}{\pi \sigma^4}\left[1 - \frac{x^2 + y^2}{2\sigma^2}\right]e^{-\frac{x^2+y^2}{2\sigma^2}} \quad (2)$$

The LoG operator expressed in formula (2) was convolved with the image I(x, y) to detect the falling spatters.

Figure 15:
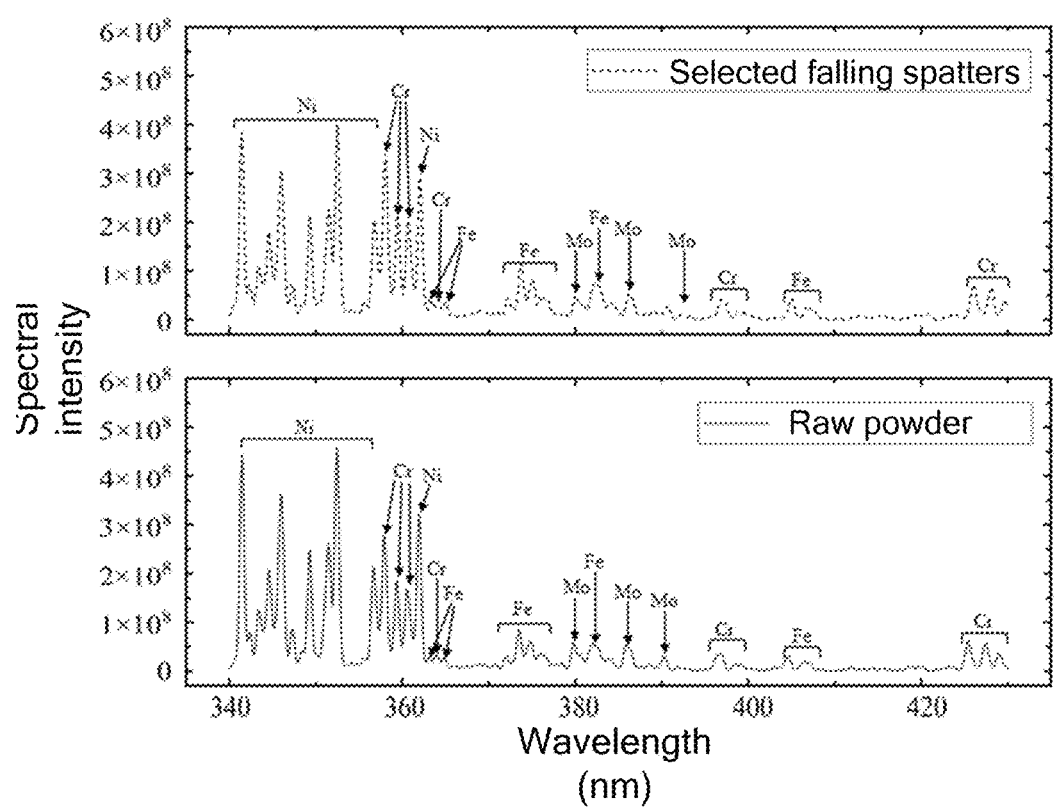
FIG. 15 is a test spectrum of powdered raw material and selected falling spatters by a LIBS online analysis system in Embodiment 4 in the falling stage.

As shown in FIG. 15, the composition content of a falling spatter at an $n^{th}$ layer was analyzed by using a LIBS online analysis system, and a spectrum obtained was obviously different from a spectrum of raw powder.

A data processing system is used to collect, analyze and count data of the obtained images, sort out the obtained data and add the data to a database.

In conclusion, by comprehensive application of strategies of "to reveal the spatter motion state by intra-layer, paraxial, point-by-point monitoring with high temporal resolution", "to obtain the spatter motion trajectory by intra-layer, coaxial, long-term monitoring with high temporal-spatial resolution" and "to reflect the spatter falling distribution by interlayer, paraxial, full-field monitoring with high spatial resolution", the in-situ monitoring of the full cycle of "spatter formation, ejection, and falling" of L-PBF spatters can be achieved. This helps to invert the impact of spatters on forming quality.

What is not mentioned above is applicable to the prior art.

While some specific embodiments of the present disclosure have been described in detail by way of examples, those skilled in the art should understand that the above examples are provided for illustration only and not for the purpose of limiting the scope of the present disclosure. Those skilled in the art can make various modifications or supplements to the specific embodiments described or replace them in a similar manner, but it may not depart from the direction of the present disclosure or the scope defined by the appended claims. Those skilled in the art should understand that any modification, equivalent replacement, improvement, and the like that are made to the above implementations according to the technical essence of the present disclosure shall fall within the protection scope of the present disclosure.

What is claimed is:

1. A method for in-situ monitoring of a full cycle of spatter formation, ejection, and falling in laser additive manufacturing, wherein the in-situ monitoring is completed by a monitoring system, the monitoring system comprises a first photographing apparatus, a second photographing apparatus, a third photographing apparatus, and a photoelectric sensor, and the method comprises the following steps:

S1, spreading a powdered material onto a substrate of the laser additive manufacturing apparatus, and covering a laser travel path range with the powdered material to form a powder bed, wherein the powdered material has a particle size of 10-500 μm;

S2, in a spatter formation stage, paraxially arranging the first photographing apparatus at the laser additive manufacturing apparatus to monitor a spatter dynamic behavior in the spatter formation stage;

in a spatter ejection stage, coaxially arranging the second photographing apparatus and the photoelectric sensor at the laser additive manufacturing apparatus to monitor a spatter kinematic behavior and radiation characteristics in the ejection stage; and in a spatter falling stage, paraxially arranging the third photographing apparatus at the laser additive manufacturing apparatus to allow an image field of view (FOV) to cover a full-field area of the powder bed to monitor a spatter distribution state and composition and content information of falling spatters in the spatter falling stage;

S3, starting a laser of the laser additive manufacturing apparatus, and scanning the powder bed formed in step S1 by the laser according to a planned path;

S4, observing a dynamic behavior and morphological characteristics of spatters above a molten pool by means of the first photographing apparatus during layered manufacturing, wherein the dynamic behavior comprises a velocity, an angle, a force state and a function of time during spatter formation; and/or observing and counting a kinematic behavior and statistical characteristics of the spatters during the spatter formation stage by means of the second photographing apparatus, and monitoring radiation characteristics of spatter particles during motion in real time by means of the photoelectric sensor, wherein the kinematic behavior comprises a velocity and an angle of spatter ejection, so as to obtain a motion trajectory of the spatter ejection, and the statistical characteristics comprise a number of the spatters; the radiation characteristics comprise thermal radiation characteristics of the spatters; and observing, during layer-by-layer superposition, a falling distribution of the spatters by means of the third photographing apparatus, and analyzing the composition and content information of the falling spatters online;

S5, collecting data of the dynamic behavior, the morphological characteristics, the kinematic behavior, the statistical characteristics, the radiation characteristics, the falling distribution, and the composition and the content obtained in step S4, and performing statistical analysis, so as to achieve the in-situ monitoring of the full cycle of spatter "formation, ejection, and falling"; and wherein the third photographing apparatus has a spatial resolution of 1-10 μm/pixel, the third photographing apparatus acquires an exposure image of no more than 0.1 second during interlayer acquisition, and a single image is output from each layer.

2. The method according to claim 1, wherein the first photographing apparatus is provided with a paraxial laser illumination source, and the first photographing apparatus has a temporal resolution of 0.1-10 μs and a spatial resolution of 1-10 μm/pixel, with a sampling time of $10^2$-$10^3$ μs at each layer.

3. The method according to claim 1, wherein the second photographing apparatus is provided with a coaxial laser illumination source, and the second photographing apparatus has a temporal resolution of 10-100 μs and a spatial resolution of 10-$10^0$ μm/pixel, with a sampling time of $10^1$-$10^3$ s at each layer.

4. The method according to claim 3, wherein the photoelectric sensor comprises a photodiode.

5. The method according to claim 1, wherein the paraxial laser illumination source has peak power of $10^0$-500 W, a wavelength of 640±10 nm or 810±10 nm, and pulse duration of 20-2,000 ns.

6. The method according to claim 1, wherein the first photographing apparatus has an image field of view (FOV) range of $10^0$-$10^1$ mm$^2$, the second apparatus has an image FOV range of $10^1$-$10^2$ mm$^2$, and the third photographing apparatus has an image FOV range of full field with $10^2$ mm$^2$.

7. The method according to claim 1, wherein the material comprises any one of a metal, a ceramic, and a polymer.

8. The method according to claim 1, wherein the coaxial laser illumination source has peak power of $10^0$-500 W, a wavelength of 640±10 nm or 810±10 nm, and pulse duration of 20-2,000 ns.

* * * * *